United States Patent Office 3,065,211
Patented Nov. 20, 1962

3,065,211
PROCESS FOR COPOLYMERIZING ACRYLONITRILE AND VINYL PYRIDINE
George N. Milford and William K. Wilkinson, Waynesboro, Va., assignors to E. I. du Pont de Nemours and Company, Wilmington, Del., a corporation of Delaware
No Drawing. Filed Nov. 17, 1960, Ser. No. 69,828
10 Claims. (Cl. 260—85.5)

This invention relates to a process for preparing polymers of acrylonitrile and vinyl pyridine, and more particularly to a novel initiator system for use in preparing acrylonitrile/vinylpyridine polymers which exhibit improved whiteness and color stability and are readily dyeable with acid dyes.

Acrylonitrile homopolymers and copolymers having about 85% or more polymerized acrylonitrile in the polymer molecule are commonly prepared from aqueous monomer solutions or dispersions using an initiator system comprising a persulfate catalyst such as sodium or potassium persulfate and a sulfoxy reducing agent such as sodium or potassium metabisulfite as the activator. Such a system has proved to be satisfactory for the production of acrylonitrile homopolymers and copolymers having a minor content of only neutral or acid copolymerized monomers. White polymers which are resistant to discoloration upon heating are provided by this process. However, when such a system is used for the preparation of certain base-modified acrylonitrile polymers, such as acrylonitrile/vinylpyridine or acrylonitrile/methyl acrylate/vinylpyridine, only discolored polymers result with poor resistance to further discoloration on heating. Other initiator systems have been used; however, it has generally been found to be necessary to incorporate color stabilizers in the polymer which is prepared.

In spinning filaments, the acrylonitrile polymer is usually dissolved in a common organic solvent for such polymers, e.g., N,N-dimethylformamide, which requires heating a slurry of the polymer in the solvent for a period of time to provide a homogeneous solution. The solution must also be maintained at an elevated temperature while it is filtered and spun. Any color instability inherent in the polymer results in fibers which may vary from a cream to light tan. Once the color has developed, no practical method is known for converting the off-color textiles to a permanent white.

It is, therefore, an object of this invention to provide whiter filaments, fibers, yarns, films, and other shaped products from acrylonitrile copolymers containing at least about 85% acrylonitrile and a minor amount of a vinylpyridine, with or without a minor amount of a copolymerizable neutral monomer. A more specific object of the invention is to provide a new and improved process for preparing vinylpyridine-modified acrylonitrile copolymers which yields color stable shaped products of improved whiteness that are readily dyeable with acid dyestuffs. A further object of this invention is to provide a new initiator system for preparing acrylonitrile/vinylpyridine polymers which eliminates the necessity for incorporating color stabilizers in the polymer. Other objects will be apparent from the detailed description of the invention which follows.

The objects of this invention are accomplished by an improvement in the process for polymerizing an acrylonitrile composition containing a small percentage of vinylpyridine which comprises carrying out the polymerization in the presence of a catalyzing amount of a relatively mild peroxide catalyst selected from the group consisting of hydrogen peroxide, alkyl and aryl hydroperoxides, acetyl and triacetone peroxides, and alkali metal perborates and percarbonates and an activator selected from the group consisting of 1-thioglycerol and 1-thiosorbitol. In the process, the polymerizable portion of the acrylonitrile composition contains from about 85% to about 98% acrylonitrile, from about 2% to 10% of a vinylpyridine, and up to about 13% of a neutral ethylenically unsaturated monomer copolymerizable with acrylonitrile and the vinylpyridine.

By the term "neutral ethylenically unsaturated monomer" it is meant those monomers which exhibit neither acid nor basic reaction. As used herein, the term "a vinyl pyridine" is intended to include those compounds having the structure

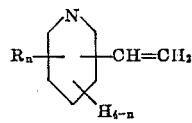

wherein R is an alkyl radical containing from one to four carbon atoms and $n$ is an integer from 0 to 4, inclusive.

In carrying out the process of the present invention, aqueous solutions of the monomers may be prepared and the polymerization carried out under widely varying conditions. For example, polymerization may be carried out in a batch or continuous manner. The monomer concentration in the polymerization medium may vary from about 10% to about 40% by weight, with the preferred concentration being from about 17% to 30% by weight. The amount of catalyst should be in the range from about 0.05% to 20% by weight, based on the weight of the monomers, and preferably from 0.5% to 10% for batch polymerization or for continuous polymerization during steady state conditions when polymer is being collected. For the startup of a continuous polymerization, the concentration of catalyst is preferably held at a high level and may be gradually reduced over a period of a few hours to a lower concentration within the range just mentioned. The activator concentration should be from about 0.1% to 2% by weight, based on the weight of the monomers.

In carrying out the process of the invention, the polymerization vessel should be well agitated. The temperature of the vessel is maintained in the range from about 15° C. to 70° C., and the pH of the polymerization medium is adjusted to from 2 to 5. Polymers produced by this process have an intrinsic viscosity in the range from 0.8 to 3.0.

In the examples which follow, polymers are prepared using different initiator systems and by different methods. These polymers are compared for (1) intrinsic viscosity (2) initial color, (3) color after being heated in solution, and (4) certain of the polymers are compared for color after being subjected to dry heat.

The intrinsic viscosities used herein are related to molecular weight by the equation $$[\eta] = 1.55 \times 10^{-4} \times M^{0.80}$$

where $\eta$ is the intrinsic viscosity and M is the weight average molecular weight.

The color tests are carried out by dissolving the polymer samples in a suitable solvent with the optical densities of the solutions being measured with a Beckman Model DU Spectrophotometer at a specified wave length.

Footnotes in the tables following the examples give specific data relating to solvent, polymer concentration, and wave lengths used in measuring the relative color values.

In the examples and throughout the specification and claims, parts and percentages are by weight unless otherwise indicated. The examples illustrate specific embodiments of the invention and are not intended to limit the present invention except as specified in the appended claims.

EXAMPLE I

A series of batch polymerizations were carried out, varying the monomer compositions, catalysts, and activators as shown in Table 1 which follows. In all cases a laboratory polymerizing kettle was charged with 80 parts of demineralized water containing one part per million of iron and acidified with sulfuric acid to a pH in the range of from 2.5 to 4.5. After heating the reaction medium to about 55° C., the air was flushed out of the polymerization vessel with nitrogen and a nitrogen atmosphere was maintained in the vessel thereafter. Twenty parts of monomer or monomer mixture of the composition shown in the table were added with stirring along with the catalyst and activator. The amount of catalyst and activator was maintained constant within any one run but was varied from run to run from 0.5% to 2.0% for the catalyst and from 0.2% to 2.0% for the activator, based on the total weight of monomer. Polymerization was allowed to proceed with stirring for sixty minutes, after which time the polymer was filtered from the reaction medium and air dried. The polymers obtained contained essentially the same proportions of polymerized monomer as appeared in the monomer feed.

sium persulfate as the catalyst and sodium metabisulfite as the activator, color values were undesirably high. In contrast, however, when the catalyst was a mild oxidant, e.g., hydrogen peroxide, sodium perborate or cumene hydroperoxide, and the activator was 1-thioglycerol or 1-thiosorbitol, polymers of excellent color values were obtained with very acceptable intrinsic viscosities. Other activators, such as thiourea and thioglycollic acid, when used with hydrogen peroxide, gave vinylpyridine-containing polymers of improved color as compared with such polymers produced with potassium persulfate/sodium metabisulfite combination; but these polymers were more highly colored than from the catalyst/activator combinations of this invention. Some other thiols, e.g., octyl mercaptan and n-dodecyl mercaptan, when used as the activator with hydrogen peroxide as the catalyst, were not productive of any polymer. Furthermore, the use of sodium chlorate as the catalyst with sodium metabisulfite activator gave vinylpyridine-containing polymer with even poorer color values than did the potassium persulfate/sodium metabisulfite combination.

EXAMPLE II

The following experiments were carried out to provide a comparison between acrylonitrile/methyl acrylate and acrylonitrile/methyl acrylate/vinylpyridine copolymers which were prepared with the following initiator systems: (1) potassium persulfate, sodium metabisulfite, (2) hydrogen peroxide, thiourea, and (3) hydrogen peroxide, 1-thioglycerol. Each experiment was carried out using an overflow type continuous polymerizer under conditions to give one hour holdup time, i.e., the average residence time of the reactants in the polymerizer was one hour. Initially the polymerizing kettle was half filled with demineralized water containing one part per million of iron and acidified with sulfuric acid to a pH of about Table 1

| Expt. No. | Composition [1] | | Catalyst [2] | Activator [2] | Intrinsic viscosity | Initial color [3] | Heated color value [4] | Dry heated color [5] |
|---|---|---|---|---|---|---|---|---|
| | Monomers | Weight, percent | | | | | | |
| 1 | AN | 100 | Persulfate | Bisulfite | 1.60 | 0.121 | 0.212 | |
| 2 | AN/MA/MVP | 91.9/5.8/2.3 | do | do | 1.27 | 0.268 | 1.405 | |
| 3 | AN | 100 | Peroxide | 1-thioglycerol | 1.70 | 0.134 | 0.235 | |
| 4 | AN/MA/MVP | 91.9/5.8/2.3 | do | do | 1.25 | 0.048 | 0.147 | |
| 5 | AN | 100 | do | Thiourea | 1.70 | 0.230 | 0.414 | |
| 6 | AN/MA/MVP | 91.9/5.8/2.3 | do | do | 1.85 | 0.206 | 0.363 | |
| 7 | AN/MA/MVP | 91.2/5.8/3.0 | Perborate | 1-thioglycerol | 1.37 | 0.052 | 0.173 | |
| 8 | AN/MA/MVP | 91.2/5.8/3.0 | Cumene hydroperoxide | do | 1.59 | 0.042 | 0.153 | |
| 9 | AN/MA/MVP | 90.7/5.8/3.5 | Peroxide | Octyl mercaptan | ([6]) | | | |
| 10 | AN/MA/MVP | 90.7/5.8/3.5 | do | n-Dodecyl mercaptan | ([6]) | | | |
| 11 | AN/MA/MVP | 90.7/5.8/3.5 | do | 1-thioglycerol | 1.82 | 0.186 | 0.442 | |
| 12 | AN/MA/MVP | 90.7/5.8/3.5 | do | 1-thiosorbitol | 2.06 | 0.202 | 0.442 | 0.112 |
| 13 | AN/MA/MVP | 90.7/5.8/3.5 | Persulfate | Bisulfite | [7] 1.76 | 0.375 | 1.043 | |
| 14 | AN/MA/MVP | 90.7/5.8/3.5 | do | 1-thioglycerol | 1.46 | 0.266 | 0.756 | 0.344 |
| 15 | AN/MA/MVP | 90.7/5.8/3.5 | Chlorate | Bisulfite | 2.25 | 0.531 | 1.104 | 0.400 |
| 16 | AN/MA/MVP | 90.7/5.8/3.5 | Peroxide | Thioglycollic acid | 1.76 | 0.224 | 0.583 | 0.195 |
| 17 | AN/MA/2-VP | 90.7/5.8/3.5 | Persulfate | Bisulfite | 1.61 | 0.302 | 0.800 | 0.159 |
| 18 | AN/MA/2-VP | 90.7/5.8/3.5 | Peroxide | 1-thioglycerol | 1.44 | 0.248 | 0.625 | 0.201 |
| 19 | AN/MVP | 96.5/3.5 | Persulfate | Bisulfite | 1.76 | 0.370 | 0.938 | 0.061 |
| 20 | AN/MVP | 96.5/3.5 | Peroxide | 1-thioglycerol | 1.33 | 0.201 | 0.380 | 0.211 |
| 21 | AN/2-VP | 96.5/3.5 | Persulfate | Bisulfite | 1.66 | 0.531 | 0.792 | 0.137 |
| 22 | AN/2-VP | 96.5/3.5 | Peroxide | 1-thioglycerol | 1.47 | 0.225 | 0.680 | 0.144 |
| 23 | AN/VAc/MVP | 86.5/10/3.5 | do | do | 1.67 | 0.215 | 0.468 | 0.066 |
| 24 | AN/t-BuAAm/MVP | 90.7/5.8/3.5 | do | do | 1.81 | 0.196 | 0.480 | 0.120 |

[1] An=acrylonitrile, MA=methyl acrylate, MVP=2-methyl-5-vinylpyridine, 2-VP=2-vinylpyridine, VAc=vinyl acetate, t-BuAAm=t-butylacrylamide.
[2] Persulfate is potassium salt, bisulfite is sodium metabisulfite, chlorate is sodium salt, peroxide is hydrogen peroxide, perborate is sodium salt.
[3] Color measured in solution, optical density readings, experiment numbers 1 to 8, 10% solutions in DMF measured at 425 mμ, experiment numbers 11 to 24, 10% solutions in butyrolactone at 400 mμ.
[4] Solutions heated 125° C. for one hour, optical density remeasured.
[5] Dry polymer in test tubes heated 130° C. for two hours, optical density in 1% butyrolactone at 400 mμ, multiply by 10 to compare with other data.
[6] No polymer. [7] Partially insoluble.

From the various color tests of the polymers produced which are recorded in Table 1, it will be noted that acrylonitrile homopolymer prepared with potassium persulfate catalyst and sodium metabisulfite activator was of good initial color with good color stability whereas, when hydrogen peroxide was the catalyst and 1-thioglycerol or thiourea the activator, color values were increased noticeably. On the other hand, in the case of all copolymers containing a vinyl pyridine and using potas- 3.75, and heated to about 55° C., which temperature was maintained throughout the run. After flushing out the air with nitrogen and thereafter maintaining an atmosphere of nitrogen in the kettle, the reactants were continuously added at a constant rate at the percentage levels specified in Example I, with sufficient water containing one part per million of iron and acid to maintain the one-hour holdup time and the pH of 3.75. The compositions, catalysts, activators, and color values of the polymers produced are defined in the same terms as in Example I and are set forth in Table 2 which follows:

procedure described in Example I and were spun into fibers by dry spinning from N,N-dimethylformamide

*Table 2*

| Expt. No. | Composition | | Catalyst | Activator | Intrinsic viscosity | Initial color | Heated color value |
|---|---|---|---|---|---|---|---|
| | Monomers | Weight, percent | | | | | |
| 25 | AN/MA | 94/6 | Persulfate | Bisulfite | 1.45 | 0.048 | 0.025 |
| 26 | AN/MA/MVP | 91.2/5.8/3.0 | ___do___ | ___do___ | [1] 1.65 | 0.253 | 1.312 |
| 27 | AN/MA | 94/6 | Peroxide | 1-thioglycerol | 1.60 | 0.085 | 0.119 |
| 28 | AN/MA/MVP | 91.2/5.8/3.0 | ___do___ | ___do___ | 1.55 | 0.045 | 0.159 |
| 29 | AN/MA | 94/6 | ___do___ | Thiourea | 1.48 | 0.370 | 0.450 |
| 30 | AN/MA/MVP | 91.2/5.8/3.0 | ___do___ | ___do___ | 1.56 | 0.123 | 0.370 |

[1] Partially insoluble.

The best initial color and color stability possessed by the acrylonitrile/methyl acrylate polymers was the polymer of Experiment 25 prepared by using the potassium persulfate/sodium metabisulfite initiator system, whereas the terpolymer of acrylonitrile/methyl acrylate/methyl vinylpyridine polymerized in this system (Experiment 26) exhibited the poorest color results and was only partially soluble. In contrast, the polymer of Experiment 28, acrylonitrile/methyl acrylate/2-methyl-5-vinylpyridine, produced with hydrogen peroxide as the catalyst and 1-thioglycerol as the activator, showed the lowest initial color of any of these polymers and very acceptable color stability.

EXAMPLE III

A series of continuous polymerization runs was carried out substantially as described in Example II with variations in pH, catalyst, activator, iron concentration, and feed rate as shown in Table 3. All the terpolymers of acrylonitrile/methyl acrylate/2-methyl-5-vinylpyridine were of similar composition. The percent conversion, intrinsic viscosities, and color values of the polymers produced are recorded in Table 3 which follows:

solutions. The fibers were subsequently drawn in a hot, wet medium. The fiber color values (FCV) or measure of the percentage of yellowness are determined by first scouring staple fiber samples at the boil for thirty minutes in deionized water containing 0.1% of a nonionic surface-active agent. The samples are then rinsed twice in deionized water, squeezed and centrifuged to remove any excess, after which they are allowed to dry in air at room temperature. A portion of the prepared dry sample weighing about two grams is carded to parallelize the fibers by means of a hand card to give a pad of staple fibers about three by six inches which is folded once lengthwise. The reflectance ratios of the samples in the green and blue filter settings of the instrument are measured using a Model IV Colormaster Differential Colorimeter, made by Manufacturing Engineering and Equipment Company of Hatboro, Pennsylvania, calibrated against the manufacturer's standard reflectance plates and National Bureau of Standards' certified reflectance plates. Two readings are taken on each side of the sample, the second measurement being made with the sample rotated 90° from the position of the first reading. Fiber color values are then calculated from

*Table 3*

| Expt. No. | Monomer (feed) AN/MA/ MVP weight, percent | Catalyst (percent) [1] | Activator (percent) [1] | pH | Iron p.p.m.[2] | Percent conversion [3] | Intr. visc. | Percent MVP | Initial color [4] | Heated color value [5] | Dry heat discoloration [6] |
|---|---|---|---|---|---|---|---|---|---|---|---|
| 31 | 92.4/5.9/1.7 | Persulfate, 0.63 | Metabisulfite, 1.00 | 4.3 | | 73.0 | 1.46 | 2.4 | 0.325 | 0.978 | 2.50 |
| 32 | 91.2/5.8/3.0 | Sodium chlorate, 1.0 | Metabisulfite, 2.00 | 2.5 | | 45.0 | 1.49 | 2.8 | 0.425 | 1.020 | 1.95 |
| 33 | 94/6 | Hydrogen peroxide, 1.0 | 1-thioglycerol, 0.40 | 3.6 | 1 | 61.0 | 1.40 | 2.5 | 0.113 | 0.415 | 0.95 |
| 34 | 91.2/5.8/3.0 | ___do___ | 1-thioglycerol, 0.30 | 3.2 | 1 | 58.1 | 1.59 | 3.5 | 0.111 | 0.406 | 0.93 |
| 35 | 91.2/5.8/3.0 | ___do___ | ___do___ | 3.2 | 1 | 60.6 | 1.59 | 3.4 | 0.081 | 0.265 | 0.75 |
| 36 | 91.4/5.8/2.8 | ___do___ | ___do___ | 3.2 | 1 | 63.5 | 1.51 | 2.8 | | | 0.43 |
| 37 | 89.9/5.7/4.4 | ___do___ | 1-thioglycerol, 0.45 | 3.2 | 1 | 61.6 | 1.55 | 4.9 | 0.107 | 0.393 | 1.22 |
| 38 | 90.7/5.8/3.5 | Hydrogen peroxide, 0.10 | ___do___ | 3.2 | 0.3 | 52.4 | 1.75 | 3.2 | 0.060 | 0.218 | 0.96 |

[1] Based on monomer. [2] Based on water.
[3] Temperature=55° C. except 35=40° C. and 36=25° C., hold-up time=60 minutes, monomer feed=20% of total except 32=13.5
[4] Polymers dissolved in butyrolactone (10% solution), optical density measured at 400 mμ.
[5] Solutions (10%) heated at 125° C. for one hour, optical density measured at 400 mμ.
[6] Dry polymers heated 130° C. for two hours, dissolved (10%), optical density measured at 400 mμ.

Again it will be noted that the polymers showing the best initial color and the best color stability were those prepared using hydrogen peroxide as the catalyst and 1-thioglycerol as the activator. All the polymers prepared with this initiator system possessed better initial color values than the other polymers, and were produced in satisfactory yield and exhibited desirable intrinsic viscosities.

EXAMPLE IV

A series of polymers were prepared according to the the average of the four readings using the following formula:

$$FCV = \frac{r.r.\ green - r.r.\ blue}{r.r.\ green} \times 100$$

where r.r. green stands for reflectance ratio with the green filter and r.r. blue stands for reflectance ratio with the blue filter.

The composition, polymerization initiation system used, and the color values are recorded in Table 4 which follows:

Table 4

| Expt. No. | Composition [1] | | Initiation system | FCV (Percent yellowness) | |
| --- | --- | --- | --- | --- | --- |
| | Monomers | Weight Per Cent | | As prepared | Heated 130° C. two hours |
| 39 | AN/MVP | 96/4 | Persulfate/metabisulfite | 19.1 | 45.9 |
| 40 | AN/MA/MVP | 91.7/5.9/2.4 | do | 14.0 | 38.6 |
| 41 | AN/MA/MVP | 91.4/5.8/2.8 | Chlorate/metabisulfite | 15.0 | 42.2 |
| 42 | AN/MA/MVP | 90.9/5.8/3.3 | Peroxide/1-thioglycerol | 6.9 | 25.8 |
| 43 | AN/MA/MVP | 90.3/5.7/4.0 | do | 10.7 | 29.8 |
| 44 | AN/MA/MVP | 89.4/5.7/4.9 | do | 11.0 | 30.0 |

[1] Composition—Actual composition of polymers.

From the table it will be noted that fibers from Experiment 42 were the whitest and had the lowest fiber color value or percentage of yellowness. It will also be noted that all fibers prepared with the hydrogen peroxide, 1-thioglycerol initiation system of this invention had lower color values than those prepared with other initiation systems.

EXAMPLE V

A continuous polymerization of a mixture of three acrylic monomers was performed in a jacketed aluminum reactor, equipped with helical baffles positioned around its interior walls. Entry ports for addition of the reagents, an agitator for stirring the contents of the vessel, and an overflow port for continuously collecting the product were also present. The monomeric mixture was comprised of 3.5 parts of 2-methyl-5-vinylpyridine, 5 to 8 parts of methyl acrylate, and 90.7 parts of acrylonitrile. The polymerization reaction mixture was maintained at 55° C. by circulating water of the proper temperature through the reactor jacket. The reactants were continuously metered to the reactor to give an average retention time in this vessel of sixty minutes.

The initiation system contained 2.5 parts of hydrogen peroxide and 0.4 part of 1-thioglycerol for each one hundred parts of monomer. The pH of the reaction mixture was controlled at 3.1±0.1 by using sulfuric acid (1 part of acid to 60 parts of total monomers). The total reagent feeds to the reactor were comprised of 20 parts of termonomer and 80 parts of water. Iron was present at a level of 0.8 part per million, based on the total reactor feeds. Conversion of monomer to polymer was 50% to 70%.

EXAMPLE VI

The polymerization equipment and conditions were the same as for Example V with the exception that nitric acid (1 part acid to 45 parts of total monomer) rather than sulfuric acid was used to control the reaction pH. Similar results were obtained.

EXAMPLE VII

The polymerization equipment and conditions were the same as for Example V with the exception that 10 parts of hydrogen peroxide and 0.6 part of 1-thioglycerol were employed for each one hundred parts of monomer. The results were similar to those obtained in Example V.

As illustrated in the examples, polymers prepared by the process of this invention exhibit improved whiteness as compared to polymers prepared when using other initiator systems.

In addition to the peroxy catalysts specifically illustrated in the examples, other mild peroxy catalysts may be utilized, i.e., peroxides such as benzoyl peroxide, acetyl peroxide, lauryl peroxide, oleoyl peroxide, triacetone peroxide, alkali metal perborates and percarbonates such as those of sodium and potassium.

Likewise, any of the many known neutral ethylenically unsaturated monomers which are copolymerizable with acylonitrile may be used to provide up to 13% of the polymer composition such as ethyl acrylate, methyl methacrylate, ethyl methacrylate, etc.; vinyl acetate, vinyl propionate, vinyl chloride, styrene, vinylidene chloride, acrylamide, methyl acrylamide, t-butyl acylamide, methyl vinyl ketone, etc.

In carrying out the present process in an aqueous system, the water used may contain trace amounts of iron in the form of an ionizable iron salt, e.g., ferric chloride, ferric bromide, ferric nitrate, ferric sulfate, etc.; however, this is not required. Generally, the water will contain from about 0.001% to about 0.05%, based on the weight of the monomers used, or up to about five parts per million, based on the weight of the water.

Even though the polymers and fibers or other shaped structures thereof have improved whiteness and better stability against heat discoloration, further improvement in dry heat discoloration may be attained by incorporating therein, for instance, by addition to the spinning solution from which the fibers are formed, a small amount, e.g., 0.1% to 2%, of triphenyl phosphite or aluminum sulfocarbolate, or by reslurrying the wet polymer in aqueous sulfuric acid at a pH of about 3–5 prior to drying or by scouring the fibers or yarns thereof in a dilute aqueous sulfuric acid bath.

The principal advantage of the process of the present invention resides in the fact that filaments, yarns, fibers, and the like, prepared from the polymers provided by this invention have a much improved and very acceptable degree of whiteness which is largely retained even when the fibers are heated at elevated temperatures. By virtue of the presence of the basic pyridine ring in the polymer, these fiber products exhibit good dyeability with acid dyestuffs and may be used very effectively in combinations with fiber products that are dyeable with basic or other type dyes or with fibers that have no dye affinity to give multicolor effects. In addition, by using the activator of this invention, the biological oxygen demand in waste liquor is materially reduced as compared with that resulting from polymerization systems using a bisulfite reducing agent.

As many widely different embodiments of this invention may be made without departing from the spirit and scope thereof, it is to be understood that this invention is not to be limited to the specific embodiments thereof except as defined in the appended claims.

We claim:

1. In the process of polymerizing an acrylonitrile composition wherein the polymerizable portion comprises from about 85% to 98% acrylonitrile, from about 2% to 10% of a vinylpyridine, and up to about 13% of a neutral ethylenically unsaturated monomer copolymerizable with said acrylonitrile and said vinyl pyridine, the improvement which comprises carrying out the polymerization in the presence of a catalyzing amount of a peroxy catalyst selected from the group consisting of hydrogen peroxide, alkyl and aryl hydroperoxides, acetyl and triacetone peroxides, and alkali metal perborates and percarbonates, and an activator selected from the group consisting of 1-thioglycerol and 1-thiosorbitol.

2. In the process of polymerizing ethylenically unsaturated monomer compositions wherein the polymerizable portion comprises from about 85% to 98% acrylonitrile, from about 2% to 10% of a vinylpyridine, and up to about 13% of a neutral ethylenically unsaturated monomer copolymerizable with said acrylontrile and said vinylpyridine, the improvement which comprises carrying out the polymerization in the presence of from 0.05% to 20.0% by weight based on the weight of the monomers of a peroxy catalyst selected from the group consisting of hydrogen peroxide, alkyl and aryl hydroperoxides, acetyl and triacetone peroxides, and alkali metal perborates and percarbonates, and from 0.1% to 2.0% by weight based on the weight of the monomers of an activator selected from the group consisting of 1-thioglycerol and 1-thiosorbitol.

3. The process of claim 2 wherein said pyridine is 2-methyl-5-vinylpyridine.

4. The process of claim 2 wherein said neutral ethylenically unsaturated monomer is methyl acrylate.

5. The process of claim 2 wherein said peroxy catalyst is hydrogen peroxide.

6. The process of claim 2 wherein said catalyst is present in an amount from about 0.05% to about 10% by weight based on the weight of the monomers.

7. In the process of polymerizing an aqueous solution containing ethylenically unsaturated monomers wherein the polymerizable portion contains from about 90% to 98% acrylonitrile and from about 2% to 10% of a vinylpyridine, the improvement which comprises carrying out the polymerization in the presence of from 0.05% to 20.0% by weight based on the weight of the monomers of a peroxy catalyst selected from the group consisting of hydrogen peroxide, alkyl and aryl hydroperoxides, acetyl and triacetone peroxides, and alkali metal perborates and percarbonates and from 0.1% to 2.0% by weight based on the weight of the monomers of an activator selected from the group consisting of 1-thioglycerol and 1-thiosorbitol.

8. The process of claim 7 wherein said vinylpyridine is 2-methyl-5-vinylpyridine.

9. The process of claim 7 wherein said peroxy catalyst is hydrogen peroxide.

10. The process of claim 7 wherein said catalyst is present in an amount from about 0.05% to about 10% by weight based on the weight of the monomers.

References Cited in the file of this patent

UNITED STATES PATENTS

| | | |
|---|---|---|
| 2,456,360 | Arnold | Dec. 14, 1948 |
| 2,635,090 | Basdekis | Apr. 14, 1953 |